United States Patent

Dickerson et al.

[11] Patent Number: 5,878,479
[45] Date of Patent: Mar. 9, 1999

[54] METHOD OF FORMING A CROSS VENTED ROTOR AND AN INITIAL CASTING FOR FORMING A VENTED ROTOR

[75] Inventors: Weston E. Dickerson, Milford; Charles E. Burger, Farmington, both of Mich.

[73] Assignee: Hayes Lemmerz International, Inc., Romulus, Mich.

[21] Appl. No.: 54,642

[22] Filed: Apr. 3, 1998

Related U.S. Application Data

[60] Provisional application No. 60/057,237 Aug. 29, 1997.

[51] Int. Cl.$^6$ .......................... B23P 13/04; B22D 11/128
[52] U.S. Cl. ........................ 29/527.6; 29/557; 188/18 A; 188/218 XL; 428/579
[58] Field of Search .................................. 29/527.6, 557; 72/340; 188/18 A, 218 XL; 428/579, 596, 598, 600

[56] References Cited

U.S. PATENT DOCUMENTS

| | | | |
|---|---|---|---|
| 3,809,192 | 5/1974 | Stehle | 188/218 XL |
| 5,480,007 | 1/1996 | Hartford | 188/18 A |
| 5,501,306 | 3/1996 | Martino | 188/218 XL |

FOREIGN PATENT DOCUMENTS

| | | | |
|---|---|---|---|
| 0 521 754 A1 | 1/1993 | European Pat. Off. | 188/218 XL |
| 58-94646 | 6/1983 | Japan | 188/218 XL |
| 60-30836 | 2/1985 | Japan | 188/218 XL |

*Primary Examiner*—P.W. Echols
*Attorney, Agent, or Firm*—Marshall & Melhorn

[57] ABSTRACT

The invention is directed to a method of forming a vented rotor for caliper disc brakes and the like. Such a vented rotor includes an outer friction portion having one or more ring sections with opposed friction surfaces adapted to interface with associated friction members. The vented rotor is formed by first casting a rotor to the desired configuration including at least the ring section. This initial casting is formed in such a manner that one or more depressions are provided a surface of the ring section. Then, material is removed in one or more machining steps from portions of the friction surface opposite the friction surface having the depressions, to the point that the depressions extend completely through the ring section to form the vents.

14 Claims, 3 Drawing Sheets

METHOD OF FORMING A CROSS VENTED ROTOR AND AN INITIAL CASTING FOR FORMING A VENTED ROTOR

RELATED APPLICATION

This application is claiming the benefit, under 35 USC §119(e), of the provisional application filed Aug. 29, 1997 under 35 USC §111(b), which was granted a serial number of 60/057,237 The provisional application, Ser. No. 60/057,237, is hereby incorporated by reference in its entirety.

BACKGROUND OF THE INVENTION

The present invention relates to rotors for caliper disc brakes and the like, and in particular to an improved method of forming a cross vented brake rotor.

Rotors are generally well known in the art, and are used extensively in vehicle braking systems, power transmission devices, clutches, and other similar machinery and mechanisms. Vehicle caliper disc braking systems slow the vehicle by inhibiting the rotation of the vehicle wheels. Rotors used in typical braking systems include a central hat section for attaching the rotor to a vehicle wheel and drive member for rotation therewith, and an outer friction portion having a pair of annular ring sections with opposed friction surfaces.

A caliper assembly secured to a non-rotating component of the vehicle, such as the vehicle frame. The caliper assembly includes a pair of brake pads disposed adjacent the rotor friction surfaces, and a moveable piston operatively connected to one or more of the brake pads. When the driver brakes the vehicle, hydraulic or pneumatic forces move the piston which clamps the pads against the friction surfaces of the rotating rotor. As the brake pads press against the moving rotor friction surfaces, frictional forces are created which oppose the rotation of the wheels and slow the vehicle. The friction converts the vehicle's kinetic energy into large quantities of heat, much of which is absorbed by the friction surfaces and conducted to the rest of the rotor and to other components to which the rotor is connected Excess heat leads to premature brake wear and/or failure. Therefore a brake rotor should quickly transfer and dissipate the heat generated during braking. Vents have been formed in the friction surfaces of the rotor to circulate air around the annular peripheral section for cooling the brake. Cross vented rotors typically have vents extending in the axial direction through the friction surfaces.

Brake rotors are typically cast from a ferrous material such as cast grey iron, and then are machined in multiple operations to shape the hat section and friction surfaces. In general, solid cast iron or cast aluminum rotors are preferred from the standpoint of strength. Rotors having cross vented friction surfaces, are typically produced by initially casting a solid rotor which is then subjected to relatively extensive machining operations to form the vents. While this has proven to be an effective means of producing vented rotors, the additional machining operations increase the cost of manufacturing such rotors. It would therefore be advantageous to provide a method of forming a cross vented rotor which is less expensive than the conventional method, and which may not be significantly more expensive than the conventional method of forming a full cast, solid rotor.

SUMMARY OF THE INVENTION

The invention is directed to a method of forming a vented rotor for caliper disc brakes and the like. Such a vented rotor includes an outer friction portion having a pair of ring section with opposed friction surfaces adapted to interface with associated friction members. A plurality of radially extending supports or ribs extend between the two ring sections to fixedly interconnect the ring sections in a mutually parallel, spaced apart relationship. A plurality of radially extending, spaced apart vents are defined between the ribs.

In accordance with the invention, the vented rotor is formed by first casting a rotor to the desired configuration including at least the ring sections. This initial casting is formed in such a manner that one or more depressions are provided in the inwardly directed surfaces of the ring sections. Then, material is removed in one or more machining steps from the outwardly directed surfaces of the ring sections proximate the depressions. Such material is removed to the point that the depressions extend completely through the respective ring section to form the vents.

An alternate embodiment of the rotor includes an outer friction portion having a single ring section with opposed friction surfaces. The vented rotor is formed by first casting a rotor to the desired configuration including at least the ring section. This initial casting is formed in such a manner that one or more depressions are provided in the friction surface of the ring section. Then, material is removed in one or more machining steps from the portion of the friction surface opposite the friction surface having the depressions. Such material is removed to the point that the depressions extend completely through the ring section to form the vents.

BRIEF DESCRIPTION OF THE DRAWINGS

The advantages of the invention will become readily apparent to those skilled in the art from the following detailed description of a preferred embodiment when considered in the light of the accompanying drawings, in which.

DESCRIPTION OF THE PREFERRED EMBODIMENT

Figure 1:
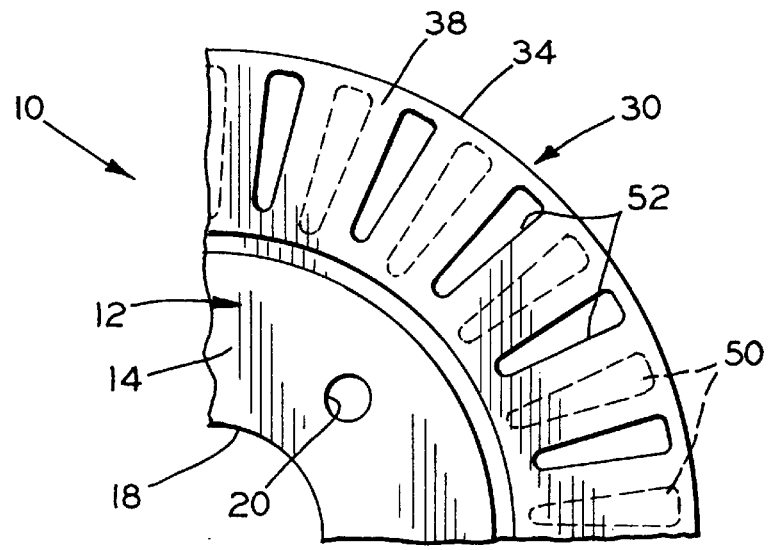
FIG. 1 is a front elevational view of a portion of a vented rotor formed in accordance with the invention.
Figure 2:
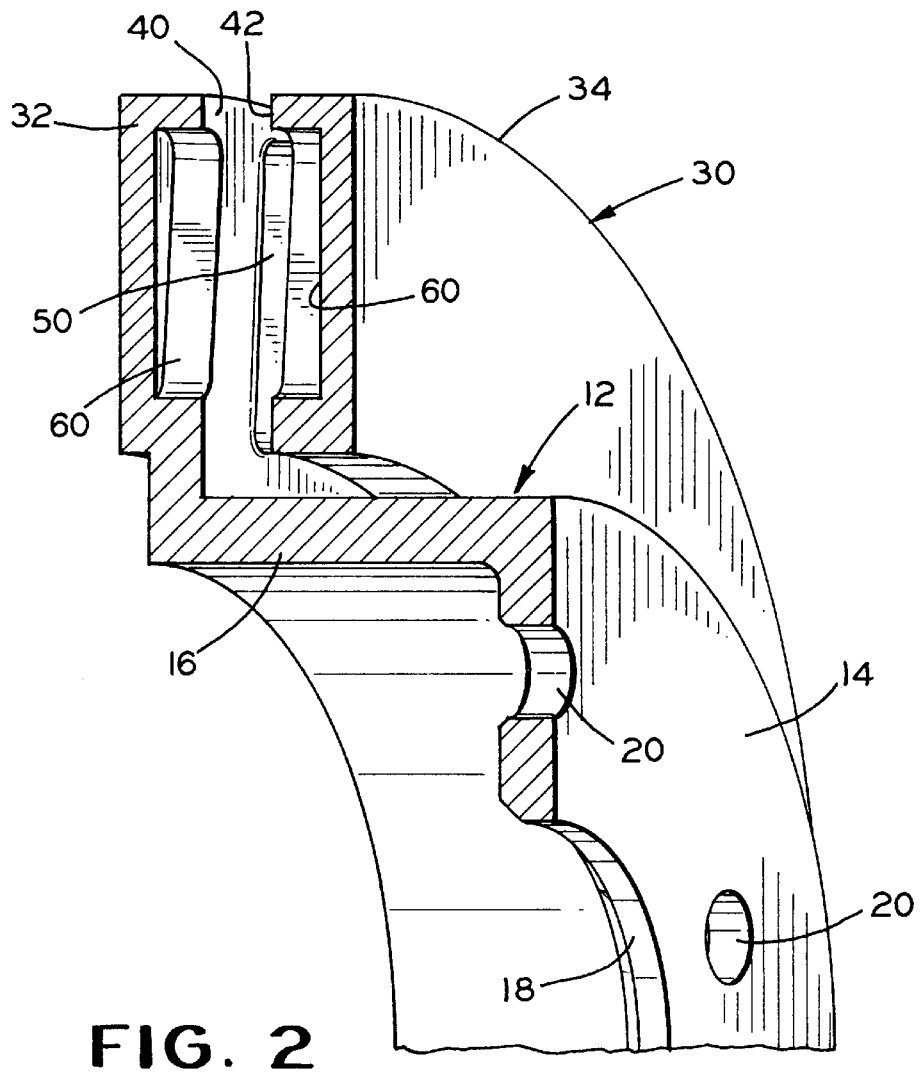
FIG. 2 is a perspective view of a section of a rotor after the casting step of the method of the invention.

For purposes of description herein, the terms "upper," "lower," "right," "left," "rear," "front," "vertical," "horizontal," and derivatives thereof shall relate to the invention oriented in FIGS. 1 and 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to the drawings, there is illustrated in FIG. 1 a vented rotor formed in accordance with the invention, denoted generally by the reference numeral 10. The rotor 10 is of the type adapted for use in conjunction with a variety of mechanical devices, such as caliper disc brakes and the like. The rotor 10 includes a radially inner hub or hat section 12 having a central mounting face 14 for mounting the rotor 10 on an associated drive member (not shown), such as a spindle or vehicle axle. The hat section 12 also includes a cylindrical shoulder or hat wall 16 extending from the periphery of the mounting face 14.

The central mounting face 14 of the hat section 12 of rotor 10 is provided with a central pilot aperture 18 in which a spindle hub or the like (not shown) may be closely received, and a plurality of circumferentially spaced apart fastener apertures 20 in which fasteners (also not shown) may be received to mount the rotor 10 on an associated drive mechanism in the conventional manner.

The rotor 10 also includes an outer friction portion, denoted generally in the drawings by the reference numeral 30. The outer friction portion 30 includes an outboard ring section 32 and an inboard ring section 34. The ring sections 32 and 34 have outwardly directed, flat annular friction surfaces 36 and 38, respectively, which are adapted to interface with associated friction members (not shown), such as brake pads or the like. Likewise, the ring sections 32 and 34 include inwardly directed annular surfaces 40 and 42, respectively.

A plurality of circumferentially spaced-apart support ribs 50 extend between the respective inwardly directed surfaces 40 and 42 of the ring sections 32 and 34. The ring sections 32 and 34 are fixedly interconnected in a mutually parallel, spaced apart relationship by the ribs 50. In the final rotor 10, a plurality of radially extending, spaced apart vents 52 are provided, as discussed below. The vents 52 are disposed between the ribs 50 and are preferably provided in both ring sections 32 and 34 to provide enhanced overall air flow about the ring sections.

In accordance with a preferred embodiment of the invention, the vented rotor 10 is formed by the following method. First, the rotor 10 is cast using any conventional casting method from a suitable material, such as grey iron, aluminum or the like, to the desired configuration including at least the ring sections 32 and 34. As shown in FIG. 2, the initial casting is formed in such a manner that one or more depressions 60 are provided in the inwardly directed surfaces 40 or 42 of the ring sections 32 and 34.

Each of the depressions 60 is formed at a location at which a vent 52 is desired in the final rotor 10, and is preferably formed of the shape desired for the vents 52 in the final rotor 10. The depressions 60 are formed of a depth, taken generally perpendicularly to the surfaces 40 and 42, which is at least equal to the desired thickness of the ring sections 32 and 34 in the final rotor 10. However, in the initial casting, the depressions 60 are formed so as not to extend completely through to the outwardly directed surfaces of the ring sections 32 and 34, as shown in FIG. 2. In this respect, FIG. 2 has not been drawn to scale for ease of illustration.

Figure 3:
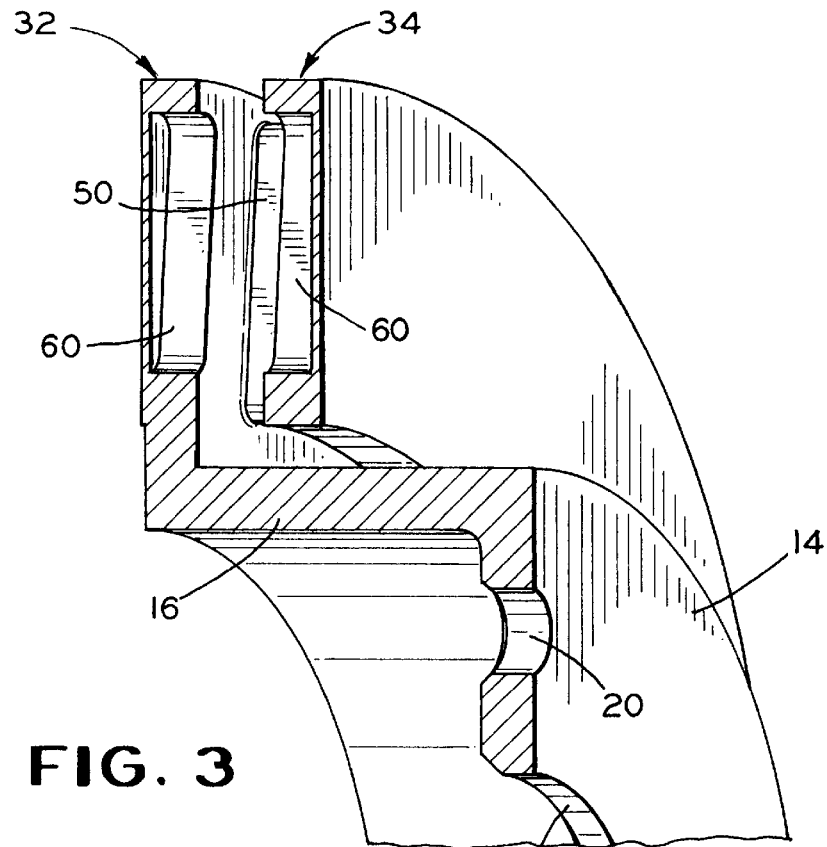
FIG. 3 is a perspective view of the rotor after a first machining step.

Next, portions of the outwardly directed surfaces of the ring sections 32 and 34 proximate the depressions 60 are removed, in one or more machining steps, to the point that the depressions 60 extend completely through the respective ring sections 32 and 34. Preferably, the initial casting shown in FIG. 2 is rough machined in the conventional manner to the desired dimensions. In such a rough machining step, portions of the outwardly directed surfaces of the ring sections 32 and 34 proximate the depressions 60 are removed, but a thin layer between the depression 60 and the outwardly directed surface of the respective ring section 32 or 34 may remain, as shown in FIG. 3.

Figure 4:
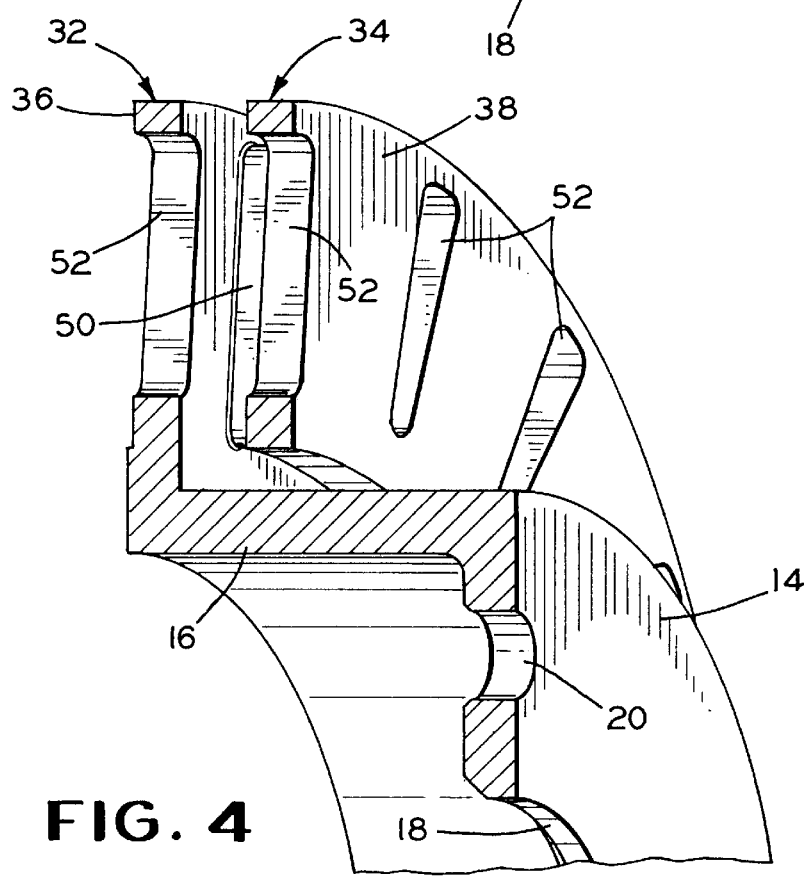
FIG. 4 is a perspective view of the rotor after a final machining step in accordance with the method of the invention.

After any rough machining step, the rotor 10 is subjected to finish machining, which removes the remaining material from the outwardly directed surfaces of the ring sections 32 and 34 so that the depressions 60 extend completely through the ring sections to form the vents 52. The finish machining step preferably includes a finish grinding step which removes the remaining material, which is typically between about 5 to 10 mils thick, to complete the vents 52 as shown in FIG. 4. The finish machining step also typically includes drilling of the central pilot aperture 18 and fastener apertures 20, although these apertures may also be formed in the initial casting, as illustrated in FIG. 2.

Figure 5:
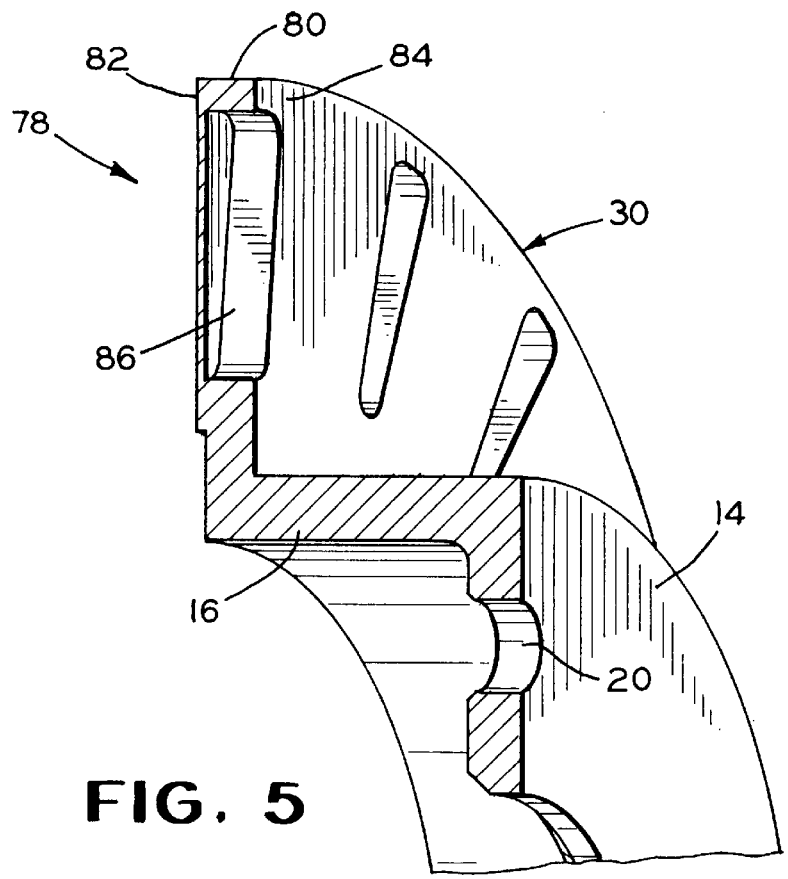
FIG. 5 is a perspective view of and alternate embodiment of the rotor after a first machining step.
Figure 6:
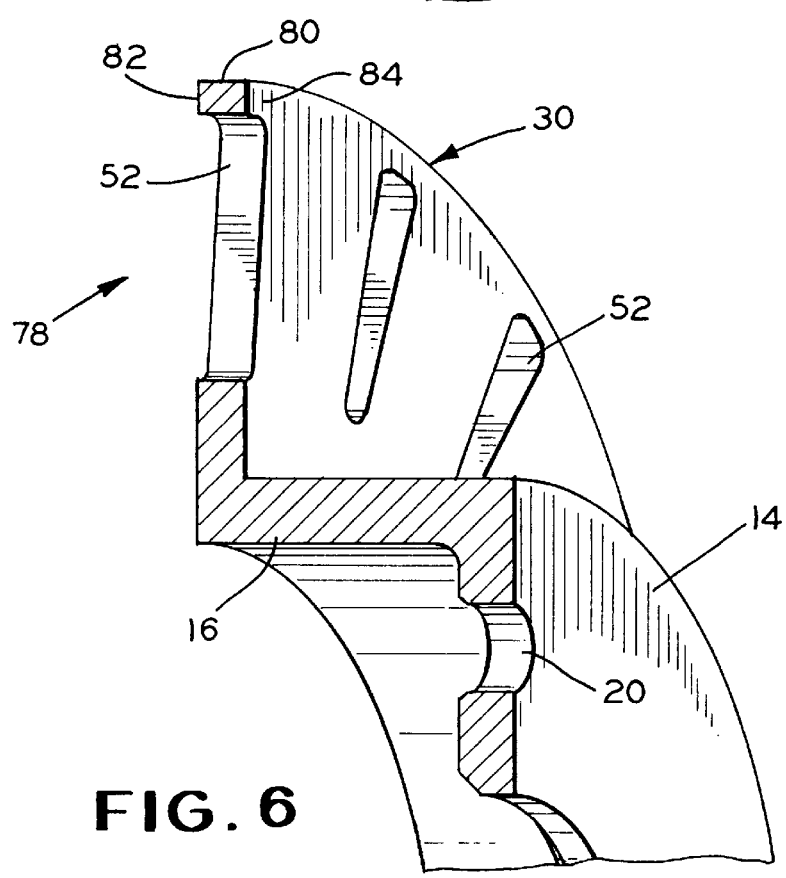
FIG. 6 is a perspective view of the alternate embodiment of the rotor after a final machining step in accordance with the method of the invention.

Referring now to FIGS. 5 and 6, an alternate embodiment of the brake rotor 78 is illustrated with similar components numbered identically to the rotor 10 described above. The outer friction portion 30 includes a single ring section 80 having opposed, flat annular friction surfaces 82 and 84 adapted to interface with the associated friction members in a manner described above.

The vented rotor 78 is formed in a similar manner as the rotor 10 described above. First, the rotor 78 is cast using any conventional casting method from a suitable material, such as grey iron, aluminum or the like, to the desired configuration including at least the ring section. The initial casting is formed in such a manner that one or more depressions 86 are provided in one of the friction surfaces 84.

Each of the depressions 86 is for med at a location at which a vent 52 is desired in the final rotor 10, and is preferably formed of the shape desired for the vents 52 in the final rotor 78. The depressions 86 are formed of a depth, taken generally perpendicularly to the friction surfaces 82 and 84, which is at least equal to the desired thickness of the ring section 80 in the final rotor 78. However, in the initial casting, the depressions 86 are formed so as not to extend completely through the ring section 80, as shown in FIG. 5. In this respect, FIG. 5 has not been drawn to scale for ease of illustration.

Next, portions of the friction surface 82 opposite the friction surface 84 having the depressions 86 are removed, in one or more machining steps, to the point that the depressions 86 extend completely through the ring section 80. Preferably, the initial casting shown in FIG. 5 is rough machined in the conventional manner to the desired dimensions. In such a rough machining step, portions of the friction surface 82 opposite the friction surface 84 having the depressions 86 are removed, but a thin layer between the depression 86 and the friction surface 82 opposite the friction surface 84 having the depressions 86 may remain as shown in FIG. 5.

After any rough machining step, the rotor 10 is subjected to finish machining, which removes the remaining material from the friction surface 82 so that the depressions 86 extend completely through the ring section 80 to form the vents 52. The finish machining step is preferably similar to the finish machining step described above. Alternatively, the depressions 86 may be formed in both of the friction surfaces 82 and 84 without extending completely through the ring section 80. The rough and finishing machining steps then remove material from both friction surfaces 82 and 84 so that the depressions extend completely through the ring section 80 to form the vents 52.

The invention thus provides a method of forming a vented rotor 10 and 78 in which the machining steps, and the expense associated therewith, are roughly equivalent to that experienced with a full-cast solid rotor.

In accordance with the provisions of the patent statutes, the present invention has been described in what is considered to represent its preferred embodiment, however it should be noted that the invention can be practiced otherwise than as specifically illustrated and described without departing from its spirit or scope.

What is claimed is:

1. A method of forming a vented rotor of the type including a hat section with a central mounting face, a hat wall extending from said mounting face and an outer ring section, comprising the steps of:
   (a) forming an initial casting including said outer ring section, wherein said outer ring section includes oppositely directed friction surfaces, and wherein a plurality of circumferentially spaced apart depressions are formed in at least one of said friction surfaces; and
   (b) removing a portion of said friction surface opposite said friction surface having said depressions in a manner such that said depressions extend completely through the ring section, each depression thereby forming a vent.

2. The method of forming a vented rotor defined in claim 1 further including the step of rough machining to remove a portion of said friction surface opposite said friction surface having said depressions in a manner such that a thin layer of said outer ring section remains between said depressions and said friction surface opposite said friction surface having said depressions.

3. The method of forming a vented rotor defined in claim 1 wherein step (a) includes forming the initial casting from grey iron.

4. The method of forming a vented rotor defined in claim 1 wherein step (a) includes forming the initial casting from aluminum.

5. A method of forming a vented rotor of the type including a hat section with a central mounting face, a hat wall extending from said mounting face and a pair of mutually parallel outer ring sections, comprising the steps of:
   (a) forming an initial casting including said outer ring sections, wherein each of said outer ring sections includes an outwardly directed surface and an inwardly directed surface which faces the other of said ring sections, and wherein one of said ring sections includes a plurality of circumferentially spaced apart depressions formed in said inwardly directed suface of said one of said ring sections; and
   (b) removing a portion of said outwardly directed surface of said one of said ring sections in a manner such that said depressions extend completely through said one of said ring sections, each depression thereby forming a vent.

6. The method of forming a vented rotor defined in claim 5 wherein step (a) includes forming an initial casting including said outer ring sections, wherein each of said ring sections includes a plurality of circumferentially spaced apart depressions formed in said inwardly directed surfaces, and step (b) includes removing a portion of said outwardly directed surfaces of said ring sections in a manner such that said depressions extend completely through the respective ring sections, each depression thereby forming a vent.

7. The method of forming a vented rotor defined in claim 5 further including the step of rough machining to remove a portion of said outwardly directed surface of said one of said ring sections in a manner such that a thin layer of said one of said ring sections remains between said depressions and said outwardly directed surface of said one of said ring sections.

8. The method of forming a vented rotor defined in claim 7 wherein said thin layer is between 5 and 10 mils thick.

9. The method of forming a vented rotor defined in claim 5 wherein step (a) includes forming the initial casting from grey iron.

10. The method of forming a vented rotor defined in claim 5 wherein step (a) includes forming the initial casting from aluminum.

11. An initial casting for subsequently forming a vented rotor comprising:
    a hat section including a central mounting face and a cylindrical hat wall extending from said mounting face; and
    a pair of ring sections secured to said hat section and interconnected in a mutually parallel, spaced apart relationship by a plurality of circumferentially spaced apart ribs, each of said ring sections having an inwardly directed surface directed towards the other of said ring sections, wherein one of said ring sections includes a plurality of circumferentially spaced apart depressions cast into said inwardly directed surface of said one of said ring sections such that said depressions do not extend completely through said one of said ring sections.

12. The initial casting defined in claim 11 wherein each of said ring sections includes a plurality of circumferentially spaced apart depressions cast into said inwardly directed surfaces such that said depressions do not extend completely through the respective ring sections.

13. The initial casting defined in claim 11 wherein said initial casting is formed of grey iron.

14. The initial casting defined in claim 11 wherein said initial casting is formed of aluminum.

* * * * *